(12) United States Patent
Matsubara

(10) Patent No.: US 6,502,972 B2
(45) Date of Patent: *Jan. 7, 2003

(54) VEHICULAR HEADLAMP HAVING A REFLECTOR WITH IMPROVED EFFICIENCY OF REFLECTION

(75) Inventor: Masao Matsubara, Shimizu (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,590

(22) Filed: Oct. 1, 1998

(65) Prior Publication Data

US 2002/0001200 A1 Jan. 3, 2002

(30) Foreign Application Priority Data

Oct. 1, 1997 (JP) ............................................. 9-268334

(51) Int. Cl.$^7$ ............................................... F21V 19/02
(52) U.S. Cl. ........................ 362/523; 362/507; 362/516; 362/528; 362/524
(58) Field of Search ................................. 362/523, 528, 362/507, 516, 517; 359/853

(56) References Cited

U.S. PATENT DOCUMENTS

| 4,839,785 A | | 6/1989 | Ohishi ........................ 362/418 |
| 4,843,531 A | | 6/1989 | Mochizuki et al. ......... 362/421 |
| 4,903,173 A | | 2/1990 | Mochizuki et al. ........... 362/66 |
| 5,546,284 A | * | 8/1996 | Harada ........................ 362/487 |
| 5,611,612 A | * | 3/1997 | Choji et al. .................. 362/459 |
| 5,678,915 A | | 10/1997 | Shirai et al. .................. 362/61 |
| 5,944,415 A | * | 8/1999 | Kurita et al. ................ 362/517 |

* cited by examiner

Primary Examiner—Cassandra Spyrou
Assistant Examiner—Fayez Assaf
(74) Attorney, Agent, or Firm—Sughrue Mion, PLLC

(57) ABSTRACT

A vehicular headlamp has a reflector which is supported at not less than three points through respective link members in relation to the lamp body in a tiltable manner. The reflector is molded by molding of a synthetic resin material. At least one of the link members is supported by an attachment piece which is integrally formed with and protrudes outward from a location where the opening periphery of a reflective surface of the reflector as viewed from the blanking direction during molding of the reflector.

25 Claims, 4 Drawing Sheets

VEHICULAR HEADLAMP HAVING A REFLECTOR WITH IMPROVED EFFICIENCY OF REFLECTION

BACKGROUND OF THE INVENTION

1. Field of the Invention

The present invention relates to a novel vehicular headlamp and, in particular, to the art of simplifying the molding dies and reducing the cost by engineering the shape of reflectors for vehicular headlamps which are formed of synthetic resin materials.

2. Description of the Related Art

A so-called reflector-mobile vehicular headlamp is equipped with two mobile supports and one stationary support in order to support the reflector in relation to the lamp body in a tiltable manner. At each support the reflector and the lamp body are linked through an individual link member.

FIGS. 3 and 4 illustrate one example of such conventional vehicular headlamps.

A vehicular headlamp a comprises a lamp body b, a reflector c made of a synthetic resin which may be supported in relation to the lamp body b in a tiltable manner, and a front lens d for covering the front opening of the lamp body b. The reflector c may be supported in relation to the lamp body b at three points, one of which is formed as a stationary support A and the other two of which are formed as mobile supports B and B.

The lamp body b has a recess e open in front and has a throughhole g formed through the rear wall f of the lamp body b at the center.

A boss h is protrusively provided on the inner surface of the rear wall f at one corner (upper right hand as viewed from the front) thereof. The boss h has an attached fulcrum axis j, on which a ball i is formed at the front end thereof. Support holes k and k are formed at two appropriately spaced locations respectively down and aside (to the left as viewed from the front) the boss h, into which aiming screws 1 and 1 may be supported in a rotatable but not axially displaceable manner.

The reflector c has a concave m open in front, which has a reflective inner surface, which in turn has a throughhole n for a light bulb formed at the center.

In addition, an attachment o is formed, protruding rearward, on the rear face of the reflector c at one corner (upper right hand as viewed from the front) thereof, at a location coinciding with the boss h. The attachment o is approximately in the shape of a prism with one side thereof open and the rear end closed and has a round attachment hole q through the rear wall p. The rear wall p of the attachment o is formed at a location lapped with the concave m of the reflector c as viewed from the blanking direction during molding of the reflector c. The attachment hole q supports a receptacle s having a spherical concave r open at the rear end.

Attachments t and t are formed, protruding rearward, at two locations (coinciding with the support holes k and k of the aiming screws 1 and 1) respectively down and aside (to the left as viewed from the front) the attachment o. These attachments t and t, like the above attachment o, are approximately in the shape of a prism with one side thereof open and the rear end closed and have rectangular attachment holes v and v through the rear walls u and u. The rear wall u of each attachment t is formed at a location lapped with the concave m of the reflector c as viewed from the blanking direction during molding of the reflector c. The attachment holes v and v may support aiming nuts w and w respectively.

As such, the ball i of the fulcrum axis j which may be supported in the boss h attached to the lamp body b will be fitted into the spherical concave r of the receptacle s which may be attached to the attachment o of the reflector c to form the stationary support A, while the aiming screws 1 and 1 of the lamp body c will be screwed into the aiming nuts w and w which may be attached to the attachments t and t of the reflector c to form the mobile supports B and B, so that the reflector c may be supported in relation to the lamp body c in a tiltable manner.

Such a conventional vehicular headlamp as described above suffers from a disadvantage that because the attachments o, t and t of the reflector c have rear walls p, u and u which are in the shape of a prism lapped with the concave m of the reflector c as viewed from the blanking direction, a so-called slider will be necessary for a molding die during molding of the reflector c in order to form the attachments o, t and t integrally as part of the reflector c, thus complicating the molding die and increasing the cost.

In addition, formation of such protrusions as the attachments o, t and t on the back side of the reflective surface of the reflector c is disadvantageous because they tend to cause 'sink marks' on the side of the reflective surface of the completed molded piece, impairing the efficiency of reflection. This disadvantage has been particularly serious in recent years when, along with the use of plain front lenses, a desired optical divergence may be formed only through a reflective surface.

SUMMARY OF THE INVENTION

It is therefore the objective of the present invention to simplify the molding dies for reflectors of vehicular headlamps to be formed of synthetic resin materials in order to reduce the cost and prevent the decrease in the efficiency of reflection of the reflective surfaces.

In order to solve the above disadvantages, according to the vehicular headlamp of the present invention, at least one of the link members linking the lamp body with a reflector may be supported by an attachment piece which is formed integrally with and protrudes outward from the location where the opening periphery of the reflective surface of the reflector lies as viewed from the blanking direction during molding of the reflector.

According to the vehicular headlamp of the present invention, therefore, since the attachment pieces of the reflector for supporting the link members are formed integrally with and protrude outward from the location where the opening periphery lies as viewed from the blanking direction of the reflector, these attachment pieces can be molded integrally with the reflector as the part thereof using a molding die which requires no slider.

The vehicular headlamp according to the present invention will hereinafter be described in detail with reference to the illustrated embodiment.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENT

Figure 1:
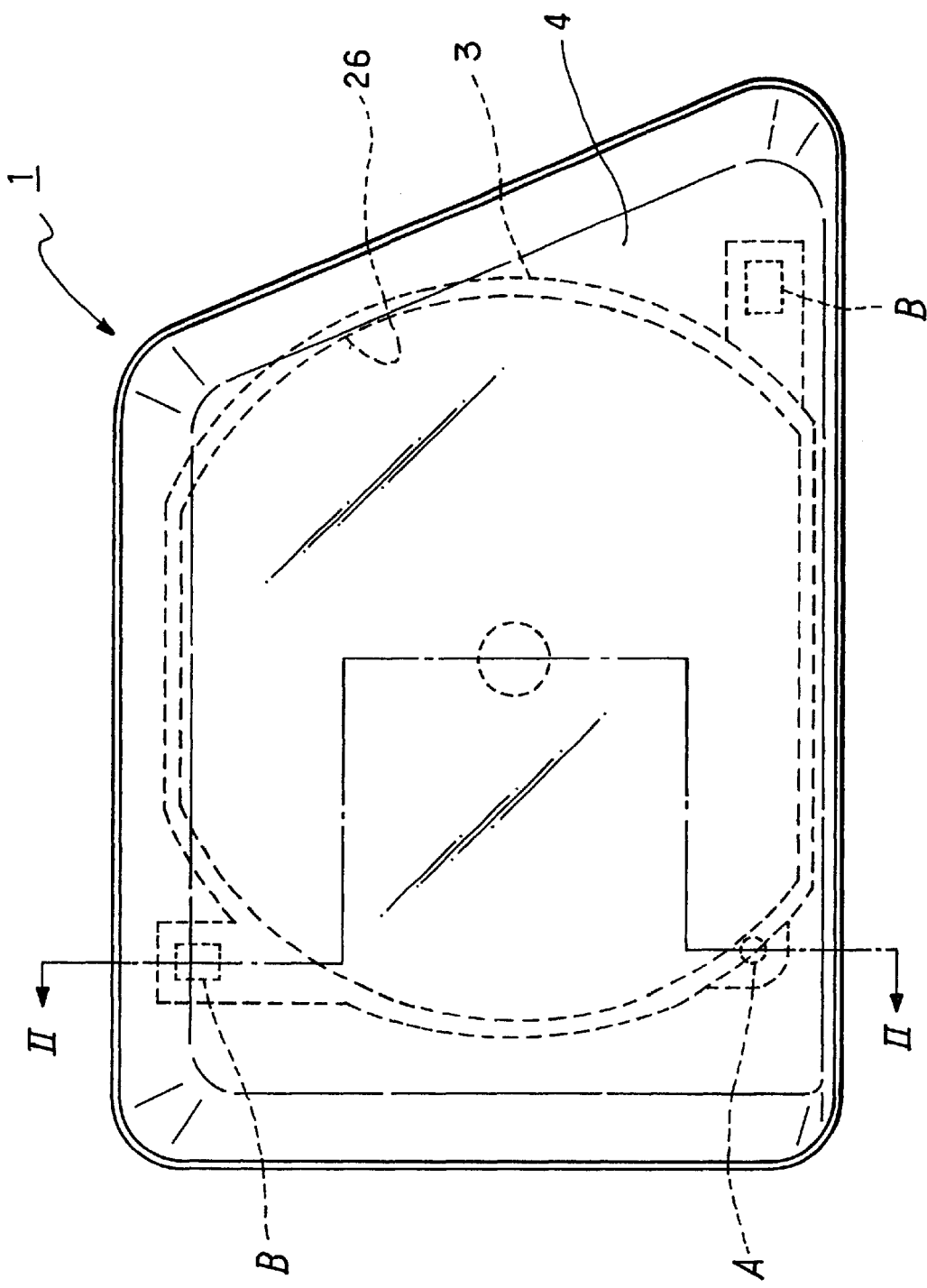
FIG. 1 is a front view of one embodiment of the vehicular headlamp according to the present invention.
Figure 2:
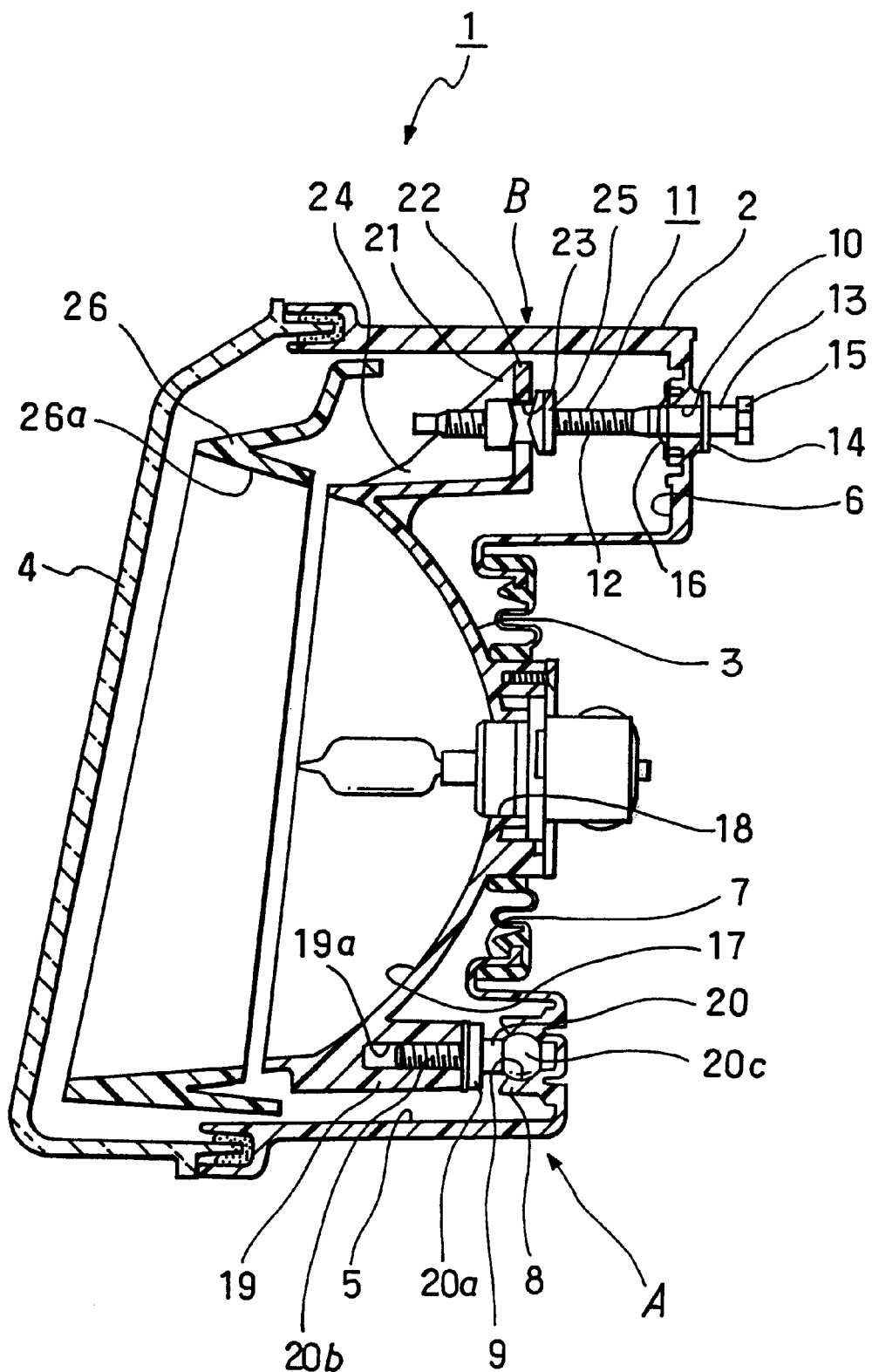
FIG. 2 is a sectional view taken along the line II—II in FIG. 1.
Figure 3:
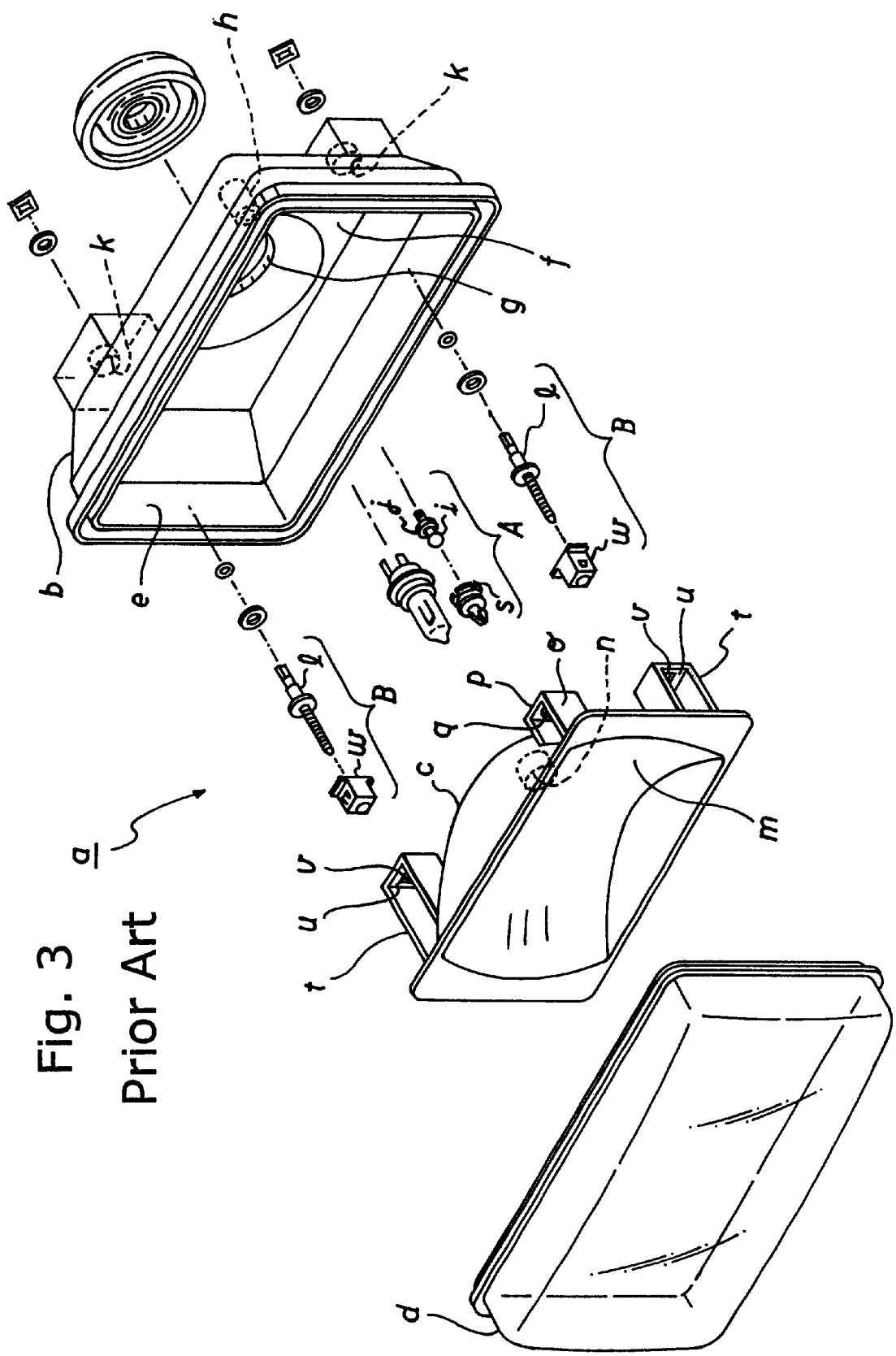
FIG. 3 is an exploded perspective view of a conventional vehicular headlamp.
Figure 4:
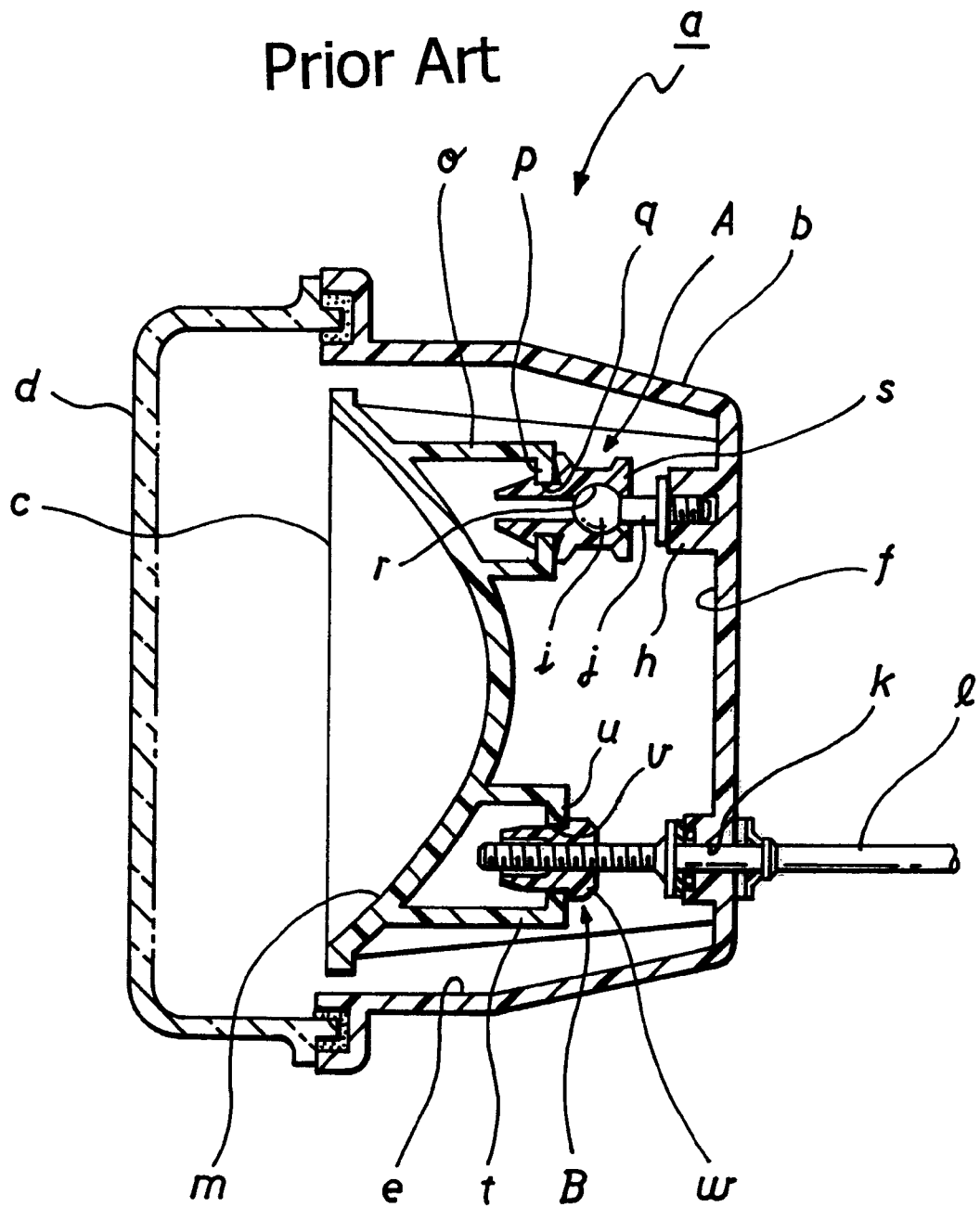
FIG. 4 is a sectional view of a conventional vehicular headlamp.

FIGS. 1 and 2 illustrate one embodiment of the vehicular headlamp according to the present invention.

Analogous to a conventional vehicular headlamp a as described above, a vehicular headlamp 1 comprises a lamp body 2, a reflector 3 made of a synthetic resin which may be supported in relation to the lamp body 2 in a tiltable manner, and a front lens 4 for covering the front opening of the lamp body 2. The reflector 3 may be supported in relation to the lamp body 2 at three points, one of which is formed as a stationary support A and the other two of which are formed as mobile supports B and B.

The lamp body 2 is made of a synthetic resin and has a recess 5 open in front and a throughhole 7 formed through the rear wall 6 of the lamp body 2 at the center.

A receptacle 8 is integral with the inner surface of the rear wall 6 in one corner (lower left hand as viewed from the front) thereof for receiving a ball of a fulcrum axis to be subsequently referred to. The receptacle 8 has a spherical concave 9 open in front.

Round, as viewed from the front, support holes 10 and 10 (only one of them is shown) are formed through the rear wall 6 of the lamp body 2 at two spaced corners respectively up and aside (to the right as viewed from the front) the receptacle 8.

Aiming screws 11 and 11 (only one of them is shown) namely, adjustment axes, may be supported in relation to the lamp body 2 in a rotatable manner.

The forward half of each aiming screw 11 is formed into a threaded length 12 to be linked with the reflector 3, the length rearward in relation to the threaded length 12 being a stem 13. The stem 13 has a flange 14 at a location closer to the rear end. Further, the aiming screw 11 has a hexagonal head 15 formed at the rear end.

The aiming screw 11 will be inserted through the support hole 10 of the lamp body 2 from behind, from the end of the threaded length 12 until the flange 14 abuts on the rear face of the rear wall 6. A retaining washer 16 will then be fitted over the part of the threaded length 12 which protrudes forward in relation to the lamp body 2 to abut the retaining washer 16 on the front face of the rear wall 6, thereby supporting the aiming screw 11 in relation to the lamp body 2 in a rotatable but not axially displaceable manner.

The reflector 3 is in the shape of a bowl a size smaller both in depth and opening than the lamp body 2. When the reflector 3 is disposed in place within the lamp body 2, the aiming screws 11 and 11 are adapted to be located outside the opening periphery of the reflector as viewed from the front. The reflector 3 has a concave 17 open in front, which has a reflective inner surface and which in turn has a throughhole 18 for a light bulb formed at the center.

A boss 19 is provided, protruding rearward, on the back face of the reflector 3 at a location coinciding with the receptacle 8. A prepared hole 19a is formed, opening at the rear face of the boss 19.

A fulcrum axis 20 is integrally composed of metal parts, and has the shape of a bar in its entirety. The length forward in relation to a flange 20a which is formed in the middle is formed into a threaded length 20b while the rear end is formed into a ball 20c.

The fulcrum axis 20 will be screwed with the threaded length 20b into the prepared hole 19a of the boss 19 formed on the reflector 3 up to the flange 20a to be thereby attached in such a manner that the ball 20c of the fulcrum axis 20 may protrude rearward at a location on the reflector 3 coinciding with the receptacle 8 of the lamp body 2.

Attachments 21 and 21 (only one of them is shown) are formed, extending backward as viewed along the blanking direction during molding of the reflector 3, along the periphery of the front opening of the reflector 3 at two spaced locations respectively up and aside (to the right as viewed from the front) the boss 19, said locations coinciding with the aiming screws 11 and 11 respectively. Each attachment 21 has an attachment piece 22 at the rear end which is integral therewith and protrudes outward in a direction generally orthogonal to the blanking direction during molding.

The attachment piece 22 has a rectangular attachment hole 23 along with a rib 24 which is integral therewith across the piece 22 and the main portion of the attachment 21 to reinforce the piece 22. Another reinforcing rib may be formed across the main portion of the attachment 21 and the back face of the reflector 3.

Aiming nuts 25 and 25 made of a synthetic resin (only one of them is shown) may respectively be supported within the attachment holes 23 and 23 of the attachment pieces 22 and 22 of the attachments 21 and 21 of the reflector 3.

As such, the ball 20c of the fulcrum axis 20 which may be supported in the boss 19 formed on the reflector 3 will be fitted into the spherical concave,9 of the receptacle 8 formed on the lamp body 2 to thereby form the stationary support A in which the fulcrum axis 20 and the receptacle 8 may form one of the link members for linking the lamp body 2 with the reflector 3.

Similarly, the aiming screws 11 and 11 of the lamp body 2 will be screwed into the aiming nuts 25 and 25 which may be attached to the attachment pieces 22 and 22 of the reflector 3 to thereby form the mobile supports B and B in which the aiming screws 11 and 11 and the aiming nuts 25 and 25 may form the other two of the link members for linking the lamp body 2 with the reflector 3.

The reflector 3 will thereby be supported at three points, one stationary support and two mobile supports, in relation to the lamp body 2 in a tiltable manner.

The reflector 3 is produced as a molded piece of a synthetic resin material; however, since the attachment pieces 22 and 22 for supporting the aiming nuts 25 and 25 are not lapped with the concave 17 of the reflector 3 as viewed from the blanking direction during molding of the reflector 3, the attachment pieces 22 and 22 may be molded integrally with the reflector as the part thereof without the use of a slider.

An extension 26 having a reflective surface 26a in alignment with the extension of the reflective surface of the reflector 3 is disposed within the lamp body 2 and forward in relation to the reflector 3. The extension 26 is adapted to cover between the reflector 3 and the sidewall of the lamp body 2 in front of the reflector 3. If the vehicular headlamp 1 was viewed from the front, therefore, the supports (stationary and mobile) for the reflector 3 to the lamp body 2 could be prevented from being viewed.

With regard to the reflector 3 according to the above embodiment, the attachment pieces 22 and 22 were described as formed at the rear ends of the attachments 21 and 21 which extend rearward from the periphery of the front opening of the reflector 3; however, the vehicular headlamp according to the present invention is not limited thereto and such attachment pieces may be directly integral with the opening periphery of the reflector 3.

Also with regard to the above embodiment, the attachment pieces at the two mobile supports of the three support points for the reflector to the lamp body were described as attachment pieces which are integrally formed with and protrude outward from the locations where the opening periphery of the reflector lies; however, as long as at least one of them is integrally formed with and protrudes outward from the location where the opening perimeter of the reflector lies, a slider for the molding die may proportionally be reduced to simplify the molding die and, therefore, to reduce the cost.

In addition, according to the above embodiment, since the ball comprising a stationary support is provided at the reflector side while the receptacle having a spherical concave is provided at the lamp body side, the receptacle may be formed integrally with the lamp body with no need for the provision of another member, with a result that the number of parts may be reduced. However, the vehicular headlamp according to the present invention is not limited thereto and rather the ball comprising a stationary support may of course be provided at the lamp body side.

As apparent from the foregoing description, according to the invention claimed in claim 1, since at least one of the link members for linking the lamp body with a reflector is supported by an attachment piece which is integrally formed with and protrudes outward from the locations where the opening periphery of the reflective surface of the reflector lies as viewed from the blanking direction during molding of the reflector, such attachment pieces may be molded integrally with the reflector body with a molding die in which a slider is not necessary for molding the pieces to simplify the molding die and reduce the cost. In addition, the reflector will have no 'sink marks' on the reflective surface, preventing the degradation in the efficiency of reflection of the reflective surface.

According to the invention claimed in claim 2, since an extension is provided forward in relation to the reflector for covering the exterior of the opening periphery of the reflector, the attachment pieces formed outside the opening periphery of the reflector within the lamp body could be prevented from being viewed, if the vehicular headlamp was viewed from the front, which may improve the appearance of the vehicular headlamp.

According to the invention claimed in claim 3, the provision of ribs which extend in a direction parallel to the blanking direction during molding on the attachment pieced formed integrally with the reflector may enhance the strength of the attachment pieces.

It should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. A vehicular headlamp, comprising:
    a reflector which is supported at not less than three points through respective link members in relation to a lamp body in a tiltable manner, wherein the reflector is molded from a synthetic resin material;
    a lens provided in front of the reflector; and
    an extension that is provided between the reflector and the lens and that covers an exterior of an opening perimeter of the reflector,
    wherein at least one of said link members is supported by an attachment piece,
    wherein the attachment piece is integrally formed with the reflector and protrudes outwardly past an opening periphery of a reflective surface of the reflector when travelling from within said opening periphery along a direction which is perpendicular to an optical axis of said reflector.

2. The vehicular headlamp according to claim 1, further including ribs on the attachment piece which extends in a direction that is substantially parallel to a direction in which light is emitted from the headlamp.

3. The vehicular headlamp according to claim 1, wherein the extension extends outwardly from the opening perimeter of the reflector such that the extension is located between the attachment piece and the lens.

4. The vehicular headlamp according to claim 3, wherein the extension fully blocks a line of sight from the lens towards the attachment piece.

5. The vehicular headlamp according to claim 4, wherein the extension contains a reflective inner surface.

6. The vehicular headlamp according to claim 5, wherein the reflective surface of the reflector and the reflective inner surface of the extension are substantially contiguous.

7. The vehicular headlamp according to claim 6, wherein the reflective surface of the reflector and the reflective inner surface of the extension form a substantially uniform concave shape.

8. The vehicular headlamp according to claim 1, wherein the extension contains a reflective inner surface.

9. The vehicular headlamp according to claim 8, wherein the reflective surface of the reflector and the reflective inner surface of the extension are substantially contiguous.

10. The vehicular headlamp according to claim 9, wherein the reflective surface of the reflector and the reflective inner surface of the extension form a substantially uniform concave shape.

11. The vehicular headlamp according to claim 1, wherein a second link member of said link members is supported by a second attachment piece, and
    wherein the second attachment piece is integrally formed with the reflector and protrudes outwardly from the opening periphery of the reflective surface of the reflector.

12. The vehicular headlamp according to claim 1, wherein the attachment piece is not substantially located within the opening periphery of the reflective surface of the reflector.

13. The vehicular headlamp according to claim 1, wherein a majority of the attachment piece is located outside the opening periphery of the reflective surface of the reflector.

14. A vehicular headlamp, comprising:
    a reflector which is connected to a lamp body at three points via first, second, and third link members, respectively, such that the reflector is tiltably supported by the lamp body, wherein the reflector is molded from a synthetic resin material; and a lens provided in front of the reflector;

wherein at least the first and second link members are supported by first and second attachment pieces, respectively, wherein the first and second attachment pieces are integrally formed with the reflector and protrude outwardly past an opening periphery of a reflective surface of the reflector when travelling from within said opening periphery along a direction which is perpendicular to an optical axis of said reflector, wherein the vehicular headlamp further comprises:
an extension that is provided between the reflector and the lens and that covers an exterior of an opening perimeter of the reflector.

15. The vehicular headlamp according to claim 14, wherein the extension extends outwardly from the opening perimeter of the reflector such that the extension is located between the first and second attachment pieces and the lens.

16. The vehicular headlamp according to claim 15, wherein the extension fully blocks a line of sight from the lens towards the first and second attachment pieces.

17. The vehicular headlamp according to claim 14, wherein the extension contains a reflective inner surface.

18. The vehicular headlamp according to claim 17, wherein the reflective surface of the reflector and the reflective inner surface of the extension are substantially contiguous.

19. The vehicular headlamp according to claim 18, wherein the reflective surface of the reflector and the reflective inner surface of the extension form a substantially uniform concave shape.

20. The vehicular headlamp according to claim 14, wherein the first and second attachment pieces respectively originate at positions located substantially at the opening periphery of the reflective surface of the reflector and respectively protrude outwardly from the positions past the opening periphery.

21. The vehicular headlamp according to claim 14, wherein the first and second attachment pieces are not substantially located within the opening periphery of the reflective surface of the reflector.

22. The vehicular headlamp according to claim 14, wherein a majority of the first and second attachment pieces are located outside the opening periphery of the reflective surface of the reflector.

23. A vehicular headlamp, comprising:
a reflector which is supported at not less than three points through respective link members in relation to a lamp body in a tiltable manner, wherein the reflector is molded from a synthetic resin material;

a lens provided in front of the reflector; and an extension that is provided between the reflector and the lens and that covers an exterior of an opening perimeter of the reflector, wherein at least one of said link members is supported by an attachment piece, wherein the attachment piece is integrally formed with the reflector and protrudes outwardly from an opening periphery of a reflective surface of the reflector, wherein the attachment piece is connected to the reflector at a front edge of the opening periphery of the reflective surface of the reflector.

24. A vehicular headlamp, comprising:
a reflector which is connected to a lamp body at three points via first, second, and third link members, respectively, such that the reflector is tiltably supported by the lamp body, wherein the reflector is molded from a synthetic resin material; and a lens provided in front of the reflector;

wherein at least the first and second link members are supported by first and second attachment pieces, respectively, wherein the first and second attachment pieces are integrally formed with the reflector and protrude outwardly from an opening periphery of a reflective surface of the reflector, wherein the vehicular headlamp further comprises:
an extension that is provided between the reflector and the lens and that covers an exterior of an opening perimeter of the reflector,
wherein the first and second attachment pieces are connected to the reflector at a front edge of the opening periphery of the reflective surface of the reflector.

25. The vehicular headlamp according to claim 1, wherein the attachment piece originates at a position located substantially at the opening periphery of the reflective surface of the reflector and protrudes outwardly from the position past the opening periphery.

* * * * *